United States Patent Office

3,310,541
Patented Mar. 21, 1967

3,310,541
METHOD OF IMPROVING THE COLOR
OF RUBBER
Wilhelm Breuers, Gerhard Kuth, Ernst-Gunther Bock, and Woldemar Tilk, Recklinghausen, Germany, assignors to Bunawerke Hüls Gesellschaft mit beschränkter Haftung, Recklinghausen, Germany
No Drawing. Filed June 11, 1962, Ser. No. 201,736
Claims priority, application Germany, June 15, 1961, B 62,918
12 Claims. (Cl. 260—82.1)

This invention relates to a method of improving the color of rubber, particularly of synthetic rubber, and even more particularly to a method of producing practically colorless synthetic rubbers prepared by emulsion polymerization.

It is well known that in the production of synthetic rubber, yellow to brown polymerizates are obtained from the emulsion polymerization of diolefins or a mixture of diolefins and vinyl monomers in the presence of an activator system consisting of peroxides, reducing agents, an iron salt and complexing agents. For example, 0.005 to 0.2 percent by weight of iron salts as related to the monomers employed, are added to the polymerization mixture with the aid of the activator. Recipes rich in iron yield latices and polymerizates of a brown color; recipes low in iron yield colorless latices and polymerizates which are light-yellow to light-brown. Unfortunately, however, as the amount of iron is decreased in these recipes, the rate of polymerization is correspondingly decreased, so that a certain minimum content of iron must be maintained in general, for commercial operation, thereby limiting the color of the polymerizates to darker shades.

The reducing agents in recipes for producing synthetic rubbers are employed as shortstop reagents, i.e., they terminate polymerization reactions prematurely. For example, it has been previously suggested that in recipes free of iron, there can be employed inorganic reducing agents such as sodium bisulfite, sodium hydrosulfite, sodium sulfoxylate formaldehyde, stannous chloride, hydroxylamine, and hydrazine. Wherever these shortstops reagents are incorporated in the recipe, the polymer is discolored.

With respect to polymerization reactions activated by iron salts, suitable shortstop agents are mainly organic substances such as p-nitrosodimethylaniline, p-tert.-butylpyrocatechol, alkali or amine salts of dialkyldithiocarbamic acids, alkylpolysulfides, and hydroxylamine together with alkyl phenols, said substances being advantageous over the inorganic reducing agents by protecting the polymerizate against crosslinking. These substances, however, more or less color the polymerizate. Even the latices mixed with faintly coloring shortstop reagents yield polymerizates which darken considerably during exposure to high temperatures.

The object of the present invention, therefore, is to provide a method for the production of colorless or lightcolored rubber, particularly synthetic rubber produced by emulsion polymerization.

Another object is to eliminate the coloration of polymers, which coloration is the result of iron salts which purposefully or inadvertently are added to a polymerization reaction or during any following step including the coagulation and washing procedure.

Still another object of this invention is to improve the color stability of rubbers at high temperatures. Still another object of this invention is to provide a method wherein it is possible to reduce the amount of the shortstop reagent that is normally employed to inhibit a polymerization reaction at a predetermined conversion rate.

Still other objects and advantages of the present invention will become apparent upon further study of the specification and appended claims.

To attain the objects of the present invention, it has been discovered that the deleterious effect of the existence of iron salts in a polymerization reaction can be substantially eliminated by adding to the rubber one or several reducing agents, the redox potential of which is sufficient to convert ferric compounds to ferrous compounds.

These reducing agents, can be added to the precipitating solutions and/or wash waters, or on the other hand they can be added directly to the polymerization latex, preferably during the period shortly prior to the termination of the polymerization reaction until the time that the latex is precipitated. It is not possible, however, to give any precise indication of time, for example in minutes or seconds of the time interval which extends from the moment of termination of the polymerization reaction to an earlier moment at which reducing agents and complexing agents are added to the latex, since the time is dependent on the polymerization velocity. This time interval has therefore to be so measured that it precludes for all practical purposes any polymerization reaction in the presence of the above mentioned additions within this interval. Consequently, it follows that this interval is short in case of rapidly proceeding polymerization reactions and relatively long in case of slowly proceeding polymerization reactions. For a further explanation, attention is directed to the following practical example. In a continuous polymerization process using a total polymerization volume of 120 m.$^3$, the average residence time of the latex is 12 hours or 6 minutes/m.$^3$, respectively. If, after 12 hours a conversion of 60% is achieved, the conversion increase within 6 minutes is 0.5%. After the last polymerization tank, the latex reaches the stop tank via a piece of tubing having a volume of 0.1 m.$^3$. The average residence time of the latex in the tubing volume is thus 36 seconds. Within this time, a conversion increase of 0.05% occurs. According to this example, there is the possibility of introducing the previously indicated additives, such as reducing and complexing agents, into the tubing, as practically no polymerization takes place therein.

By termination of a polymerization, we understand the discontinuance of the chain-growth of the polymer molecules as a result of the nature and quantity of the employed substances in the polymerization recipe as well as the premature termination of the polymerization reaction with the aid of an interrupting substance, whereby it is immaterial whether the reaction is discontinued for example at an exchange rate of 10% or 90%.

"Latex" or "emulsion" is intended to convey the condition of a synthetic latex which is present until coagulation, regardless of what further ingredients, e.g., extender oils the latex contains after the polymerization is completed.

In addition to the incorporation of the reducing agents, it is preferable to add one or more complexing agents which are capable of forming a complex with iron. These complexing agents are particularly desirable in recipes which ordinarily require little or no iron complexing agent; or in those instances where the reducing agent is added only to the precipitating solutions or wash waters respectively. It is even more preferable to add the complexing agents simultaneously with the reducing agents.

By resorting to chemical handbooks, it is relatively simple to select those reducing agents which are capable of reducing ferric compounds to ferrous compounds in aqueous solutions. Even without such handbooks, an experiment can be performed to determine if a reducing agent has sufficient redox potential to perform the required reduction. Such an experiment can readily be conducted by mixing in a preliminary test, an aqueous ferric salt solution with an excess of reducing agent at various pH values, and heating the mixture, if necessary, to 60° C. until decoloration occurs. The pH range to be examined is limited by the pH value of the latex concerned and of the precipitating medium. Atmospheric oxygen is to be excluded. A suitable indicator is, for example, in the acid range, the natural color of the ferric complex of ammonia thioglycolate in an ammoniacal solution. In the case of such reducing agents which are also, or only effective in the alkaline range, the clearly visible and very sensitive color reactions of ferric ions can be transferred from the aqueous phase to the alkaline emulsified polymerizate.

Among the numerous reducing agents that can be employed in this invention, the preferred agents include sodium dithionite, formaldehyde, sodium sulfoxylate formaldehyde, salts of hypophosphorous acid, glucose, and ascorbic acid.

With respect to the selection of suitable agents which can form complexes with iron, again it is possible to be directed to such reference books as Smith, The Sequestration of Metals, The Macmillan Company, New York, 1959, and Martel and Galvin, Chemistry of the Metal Chelate Compounds, Prentice-Hall, Englewood Cliffs N.J., 1952. Among the preferred complexing agents are ethylene-diamine tetraacetic acid also in combination with triethanolamine or with N,N-di(2-hydroxyethyl)-glycine; N-hydroxyethylethylenediamine triacetic acid; diethylenetriamine pentaacetic acid; 1,2-diaminocyclohexane tetraacetic acid; N,N-di(2-hydroxyethyl)-glycine; gluconic acid; thioglycolic acid; oxalic acid; citric acid; and the salts thereof.

It has also been discovered that a combination of the complexing agent and the reducing agent is often more effective than the same amount by weight of the two components by themselves. For example, in the case of a rubber as will be seen in the table under test No. 5, where 0.25% by weight instead of 0.2% by weight of sodium sulfoxylate formaldehyde in relation to monomers is added to the interrupting solution, the resultant rubber shows, after the heat decoloration, the same color shade as the rubber of Example 5. If, however, 0.05 part by weight of sodium sulfoxylate formaldehyde is replaced by the same amount of sodium ethylene diamine tetraacetate, a rubber is obtained which is lighter after heat treatment as can be seen from Example 6 of the table.

Moreover, it is possible to reduce the amount of reducing agent that is normally required if the complexing agent is simultaneously added therewith. This is particularly significant when employing those recipes containing a relatively high content of iron (about 0.15 part by weight of ferrous sulfate heptahydrate per 100 parts of monomer). For example, all other things being equal, it has been observed that the simultaneous addition of reducing agent and complexing agent can result in at least about 50% reduction in the content of the reducing agent.

In general, the concentration of iron in the polymerization recipe determines the necessary amount of reducing agent and complexing agent. For example, a recipe rich in iron requires more reducing agent than one low in iron. In practice, when utilizing commercial recipes, it has been found that the color of synthetic rubber is improved significantly if there are added to every 100 parts by weight of monomers, about 0.01–1 part by weight preferably 0.05–0.3 part by weight of one or several reducing agents.

With respect to the required content of complexing agent, again there is a dependency on the iron content of the polymerization latex. In general, however, based on 100 parts by weight of monomers, satisfactory results are obtained with 0.01–1 part, and preferably 0.05–0.3 part of the complexing agent.

As stated previously, it is advantageous to add the reducing agent and the complexing agent simultaneously. Furthermore, in many instances it is advantageous to add the reducing agent together with the shortstop agent. Conventional shortstop agents include such components as p-nitroso dimethyl aniline, sodium dimethyl dithiocarbamate, and alkali polysulfide. It is preferred that the shortstop and reducing agents be united as one mixture, and then added to the latex. By virtue of this simultaneous addition of shortstop agent, reducing agent and complexing agent, it is possible to effect a considerable reduction in the amount of the shortstop agent. It is to be appreciated, however, that the reducing agent can also be added to the latex either prior to, or subsequent to the addition of the shortstop agent.

The process of this invention is obviously applicable to all polymerization processes, or rubbers and rubberlike materials in latex or precipitated form which contain iron. It should be appreciated that the iron need not be a component of the polymerization recipe, but it can be inadvertently added as an impurity of the water or the chemicals which are employed in the polymerization or precipitation or wash processes.

Also this invention is particularly suitable for rubbers produced from diolefins, such as 1,3-butadiene, or mixtures of diolefins with vinyl monomers, which rubbers are synthesized by emulsion polymerization in the presence of an iron activator. Among the rubbery materials which can be benefitted by the present process are common synthetics such as butadiene-acrylonitrile, butadiene-methyl methacrylate, and butadiene-styrene.

This invention is also suitable for improving the color characteristics of the so-called Ziegler polymerizates, many of which employ an iron component in the complex catalyst.

In general, therefore, it can be fairly stated that the present invention is applicable to all rubbery polymers and rubbers and rubberlike materials in latex or coagulated form which contain iron or an iron impurity and, of course, this includes rubbers or rubberlike materials as latices which are modified by fillers or additives such as softening oils, especially oils, which are suitable for the production of oil extended rubbers. The present invention is, of course, also applicable to all rubbers and rubberlike polymerizates which are obtained from mixtures of the previously mentioned latices and also from mixtures of these latices with iron-free latices of rubber and rubberlike polymerizates.

It is believed that the preceding description of the invention enables one skilled in the art to practice this invention without the necessity of further information. The preferred specific embodiments, therefore, are merely presented to illustrate the invention, and accordingly, are not intended to be limitative of the remainder of the specification or appended claims in any way whatsoever:

*Example 1*

An emulsion polymerization is conducted with a mixture comprising 71 parts by weight of butadiene, 29 parts by weight of styrene, 0.02 part by weight of ferrous sulfate, and 0.05 part by weight of a reducing agent and 0.04 part by weight of sodium ethylenediamine tetraacetate; and the polymerization is terminated at a conversion rate of 60% by adding a shortstop containing sodium dimethyldithiocarbamate. The latex is freed from the monomers and precipitated with sodium chloride and sulfuric acid.

The resulting coagulum is then dried, and molded at 200 atm. (gage) at 150° C., the final plate being yellow in color. The color of this article during thermal storage, especially in the presence of atmospheric oxygen, darkens in direct proportion to the value of the temperature and the length of the heating period. Samples which present only slight differences in color after being molded may differ significantly after heat treatment. For the purpose of testing the effect of thermal storage on color, the molded rubber sample is heated to 170° C. in a drying chamber for 25 minutes in the presence of air.

In this example (Test No. 3) and other examples, the color of the heat-treated sample and the unheated sample is described in the table following the described examples. The color gradation is represented in such a way that an index of values of 0–10 signifies a color gradation of from almost white or colorless to dark brown; the higher the number, the darker the color.

*Example 2*

Based on 100 parts of monomer, there is added together with the shortstop solution, 0.2 part by weight of sodium sulfoxylate formaldehyde to the monomer. The latex produced according to Example 1, is further processed according to the example. The resultant rubber plate is clearly lighter than that of Example 1, the difference in color becoming even more apparent after the heat test (see table, test No. 4 vs. No. 3).

The same result may be achieved by replacing the 0.2 part by weight of sodium sulfoxylate formaldehyde with 0.2 part by weight of sodium phosphite or 0.3 part by weight of sodium dithionite or a mixture of 0.15 part by weight of sodium dithionite and 0.1 part by weight of sodium hypophosphite.

*Example 3*

A synthetic latex produced by emulsion polymerization according to Example 1, is mixed, during the polymerization inhibition step, with a sodium dimethyldithiocarbamate shortstop, 0.25 part by weight of ascorbic acid and 0.12 part by weight of sodium diethylenetriaminepentaacetate. After precipitation with sodium chloride and sulfuric acid, an almost colorless rubber of the color as shown in the table is obtained. (See table test No. 14.)

*Example 4*

A synthetic latex produced by emulsion polymerization according to Example 1, is mixed, during the polymerization termination step with a sodium dimethyldithiocarbamate shortstop, with 0.1 part by weight of glucose, 0.1 part by weight of sodium hypophosphite and 0.09 part by weight of sodium N-hydroxyethylethylenediaminetriacetate, as related to 100 parts by weight of the monomers. After precipitation with sodium chloride and sulfuric acid, an almost colorless rubber is obtained (see table, test No. 15).

*Example 5*

A polymerized latex prepared according to Example 1 is freed from its monomers, and to said monomer-free latex are added 0.2 part by weight of sodium sulfoxylate formaldehyde and 0.1 part by weight of sodium ethylene diamine tetraacetate as related to the hydrocarbon employed. The color improvement of the rubber corresponds to test No. 16 of the table.

*Example 6*

A polymerized latex prepared and separated from its monomers according to Example 1 is coagulated with sodium chloride and sulfuric acid. For the coagulation of 100 parts by weight of rubber, 0.5 part by weight of sodium sulfoxylate formaldehyde and 0.14 part by weight of sodium ethylenediamine tetraacetate are added to the coagulation solution. The wash water for the precipitated coagulum is mixed with 0.5 part by weight of sodium sulfoxylate formaldehyde and 0.015 part by weight of sodium ethylenediamine tetraacetate. The color of the unheated rubber sample and of the sample heated in the drying chamber may be seen from test No. 23.

*Example 7*

A synthetic latex is produced by emulsion polymerization from 71 parts by weight of butadiene, 29 parts by weight of styrene, 0.14 part by weight of ferrous sulfate and 0.17 part by weight of potassium pyrophosphate, and the polymerization is terminated at a conversion rate of 60% with a shortstop solution containing hydroxylamine. The latex freed of monomers is coagulated with sodium chloride and sulfuric acid and the coagulum is then dried. A brown product is obtained which takes on a deep dark brown color during the heat test (see table, test No. 21).

If, however, 0.3 part by weight of sodium sulfoxylate formaldehyde and 0.25 part by weight of sodium ethylenediamine tetraacetate are added to the shortstop solution, a light yellow rubber is obtained which is darkened only slightly by the heat test (see table, test No. 22).

*Example 8*

A synthetic latex is produced by emulsion polymerization from 52 parts by weight of butadiene, 48 parts by weight of styrene, 0.02 part by weight of ferrous sulfate, 0.05 part by weight of reducing agent and 0.04 part by weight of sodium ethylenediamine tetraacetate; and at a conversion rate of 60%, said latex is mixed with a sodium dimethyl-dithiocarbamate shortstop, 0.2 part by weight of sodium sulfoxylate formaldehyde and 0.08 part by weight of sodium ethylenediamine tetraacetate. The latex freed of monomers is precipitated with sodium chloride and sulfuric acid, and the coagulum is dried.

The synthetic rubber thus produced exhibits considerably lighter colors, both unheated and heated than the rubber obtained without the addition of reducing agents and complex components (see test Nos. 17 and 18).

*Example 9*

0.23 part by weight of sodium sulfoxylate formaldehyde and 0.88 part by weight of sodium ethylenediamine tetraacetate are added to a synthetic latex produced by emulsion polymerization from 65 parts by weight of butadiene, 35 parts by weight of acrylonitrile, 0.005 part by weight of ferrous sulfate, 0.03 part by weight of sodium ethylenediamine tetraacetate and 0.05 part by weight of sodium sulfoxylate formaldehyde. The latex freed of monomers is precipitated with sodium chloride and sulfuric acid, and then dried. The product is lighter than that obtained without the addition of sodium sulfoxylate formaldehyde and complex components (see test Nos. 19 and 20). Similar lighter colors of the rubber polymerizates according to Examples 1, 7, 8 and 9 are obtained if the complexing agents listed in Examples 3–6 or in the table under test Nos. 6–16, 18, 20, 22 and 23 are exchanged for those belonging to the group of the ethylene diamine tetraacetic acid and its alkali-, ammonia- or amine salts. The same color lightening effect is achieved on the above mentioned rubbers with the aid of alkali-, ammonia-, or amine-salts of thioglycolic acid, oxalic acid and N,N-di(2-hydroxyethyl)glycine.

TABLE

| Test No. | Rubber Type According To Example— | FeSO7H2O, Percent By Weight Based On The Hydrocarbons | Shortstop | Additives | | Color Of The Pressed Plate | |
|---|---|---|---|---|---|---|---|
| | | | | Reducing Agent, Percent By Weight Related To The Hydrocarbon | Complexing Agent, Percent By Weight Related To The Hydrocarbon | Untreated | After Heat Treatment |
| 1 | 1 | 0.02 | | | | 1 | 2 |
| 2 | 1 | 0.02 | Hydroxylamine | | | 3 | 5–6 |
| 3 | 1 | 0.02 | Sodium dimethyldithiocarbamate | | | 4 | 7 |
| 4 | 1 | 0.02 | ___do___ | 0.2 sodium sulfoxylate formaldehyde | | 3 | 4 |
| 5 | 1 | 0.02 | Hydroxylamine | ___do___ | | 2 | 4 |
| 6 | 1 | 0.02 | ___do___ | ___do___ | 0.05 sodium ethylendiamine tetraacetate | 2 | 3 |
| 7 | 1 | 0.02 | ___do___ | 0.2 sodium hypophosphite | ___do___ | 2 | 4 |
| 8 | 1 | 0.02 | ___do___ | 0.3 sodium dithionite | ___do___ | 2 | 4 |
| 9 | 1 | 0.02 | ___do___ | 0.1 sodium hypophosphite, 0.15 sodium dithionite | ___do___ | 2 | 4 |
| 10 | 1 | 0.02 | ___do___ | 0.2 sodium sulfoxylate formaldehyde | 0.09 sodium N-hydroxyethyl ethylenediamine triacetate | 2 | 4 |
| 11 | 1 | 0.02 | Hydrazine | ___do___ | 0.05 sodium ethylendiamine tetraacetate | 2 | 3–4 |
| 12 | 1 | 0.02 | ___do___ | ___do___ | 0.06 sodium N-hydroxyethyl ethylenediamine triacetate | 2 | 3–4 |
| 13 | 1 | 0.02 | Sodium dimethyldithiocarbamate | 0.1 sodium hypophosphite, 0.02 formaldehyde | 0.08 sodium ethylenediamine tetraacetate | 3 | 4 |
| 14 | 1 | 0.02 | ___do___ | 0.25 ascorbic acid | 0.12 sodium diethylenetriamine pentaacetate | 2 | 3–4 |
| 15 | 1 | 0.02 | ___do___ | 0.1 sodium hypophosphite, 0.1 glucose | 0.09 sodium N-hydroxyethyl ethylenediamine triacetate | 3 | 4 |
| 16 | 1 | 0.02 | ___do___ | 0.2 sodium sulfoxylate formaldehyde | 0.08 sodium ethylenediamine tetraacetate | 2–3 | 3 |
| 17 | 8 | 0.02 | ___do___ | | | 4 | 7 |
| 18 | 8 | 0.02 | ___do___ | 0.2 sodium sulfoxylate formaldehyde | 0.08 sodium ethylenediamine tetraacetate | 2–3 | 4 |
| 19 | 9 | 0.005 | ___do___ | | | 4–5 | 10 |
| 20 | 9 | 0.005 | ___do___ | 0.2 sodium sulfoxylate formaldehyde | 0.08 sodium ethylenediamine tetraacetate | 3 | 9 |
| 21 | 7 | 0.14 | ___do___ | | | 8 | 9 |
| 22 | 7 | 0.14 | ___do___ | 0.3 sodium sulfoxylate formaldehyde | 0.25 sodium ethylenediamine tetraacetate | 2 | 3–4 |
| 23 | 1 | 0.02 | ___do___ | 0.6 sodium sulfoxylate formaldehyde.[1] | 0.1 sodium ethylendiamine tetraacetate.[1] | 2–3 | 3–4 |

[1] Added to precipitating solution and wash water.

The preceding examples can be repeated with the other rubbers mentioned in the foregoing description of this invention, thereby obtaining similar results.

Furthermore, the preceding examples can be repeated with significant degrees of success by replacing the specific reducing agents of the examples with other reducing agents capable of lowering the valence of a ferric compound to a ferrous compound. Likewise, the complexing agents for iron can be replaced with other known complexing agents, with no significant change in results.

Also, it is important to note that this invention is not restricted to any particular type of initiator. In general, however, a peroxide initiator is employed in a concentration of about 0.01 to 0.1 part of monomer. For a more detailed discussion of the various initiators that can be employed in this invention, reference is respectfully invited to Boström, Kautschuk-Handbuch, Band I, Berliner Union, Stuttgart, 1959.

Similarly, this invention is not restricted to any particular type of shortstop agent, which agents are usually added to the latex in amounts of 0.05 to 0.5 part by weight based on 100 parts of monomer. Again, for a detailed discussion, reference is directed to Methoden der organischen Chemie, Houben-Weyl, Band 14; Makromolekulare Stoffe, Teil 1, Georg Thieme-Verlag, Stuttgart, 1961.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably and intended to be within the full range of equivalence of the following claims.

What is claimed is:

1. A method of improving the color of a polymer of 1,3-butadiene contaminated by ferric or ferrous compounds, said polymer being produced by polymerization and subsequent coagulation of the resultant latex, which method comprises adding to said latex at least one reducing agent having a redox potential sufficient to convert ferric compounds to ferrous compounds, said addition of reducing agent being conducted during a period between shortly prior to the termination of the polymerization reaction until the time that the latex is coagulated, said period being one wherein substantially no polymerization takes place.

2. A method as defined by claim 1 wherein said polymer of 1,3-butadiene is selected from the group consisting of homopolymer of 1,3-butadiene, copolymer of 1,3-butadiene and acrylonitrile, copolymer of 1,3-butadiene and methylmethacrylate, and copolymer of 1,3-butadiene and styrene.

3. A method as defined by claim 1, further comprising adding to said latex an iron-complexing agent.

4. A method as defined by claim 1 wherein said polymer of 1,3-butadiene is a copolymer of butadiene and styrene produced by emulsion polymerization, said emulsion comprising in parts by weight 100 parts monomers, about 0.005–0.2 part ferrous sulfate heptahydrate, and a short-stop agent selected from the group consisting of hydroxylamine, sodium dimethyl dithiocarbamate, and hydrazine, and wherein said reducing agent is added to said latex in an amount of 0.01–1 part, said reducing agent being selected from the group consisting of sodium sulfoxylate formaldehyde, sodium hypophosphite, sodium dithionite, formaldehyde, glucose, and ascorbic acid.

5. A method as defined by claim 4, further comprising adding to said emulsion 0.01–1 part of an iron-complexing agent selected from the group consisting of alkali, ammonium and amine salts of ethylenediamine tetraacetic acid; ethylenediamine tetraacetic acid in combination with triethanolamine; ethylenediamine tetraacetic acid in combination with N,N-di(2-hydroxyethyl)-glycine; N-hydroxyethylethylenediamine triacetic acid; diethylenetriamine pentaacetic acid; 1,2-diaminocyclohexane tetraacetic acid; N,N - di(2-hydroxyethyl)-glycine; thioglycolic acid; and oxalic acid.

6. A method as defined by claim 5 wherein the shortstop agent, reducing agent, and complexing agent are added to the emulsion simultaneously.

7. In a method of producing synthetic rubber by adding a coagulating solution to a rubber latex containing a ferric or ferrous compound, and washing the resultant precipitated coagulum with a wash water solution, said synthetic rubber being a polymer of 1,3-butadiene, the improvement which comprises adding to at least one of said coagulating solution and wash water solution, at least one reducing agent having a redox potential sufficient to convert ferric compounds to ferrous compounds.

8. In a method of producing synthetic rubber by adding a coagulating solution to a rubber latex containing a ferric or ferrous compound, and washing the resultant precipitated coagulum with a wash water solution, said synthetic rubber being a polymer of 1,3-butadiene, the improvement which comprises adding to at least one of said coagulating solution and wash water solution, at least one reducing agent having a redox potential sufficient to convert ferric compounds to ferrous compounds, and an iron-complexing agent.

9. In a method of producing synthetic rubber by adding a coagulating solution to a rubber latex containing a ferric or ferrous compound, and washing the resultant precipitated coagulum with a wash water solution, said synthetic rubber being a polymer of 1,3-butadiene, the improvement which comprises adding to at least one of said precipitating solution and wash water solution, 0.01–1 part of a reducing agent selected from the group consisting of sodium sulfoxylate formaldehyde, sodium hypophosphite, sodium dithionite, formaldehyde, glucose, and ascorbic acid.

10. The method of claim 9 further comprising adding to at least one of said precipitating solution and wash water solution 0.01–1 part of an iron-complexing agent selected from the group consisting of alkali, ammonium and amine salts of ethylenediamine tetraacetic acid; ethylenediamine tetraacetic acid in combination with triethanolamine; ethylenediamine tetraacetic acid in combination with N,N-di(2-hydroxyethyl)-glycine; N - hydroxyethylethylenediamine triacetic acid; diethylenetriamine pentaacetic acid; 1,2-diaminocyclohexane tetraacetic acid; N,N-di(2-hydroxyethyl)-glycine; thioglycolic acid; and oxalic acid.

11. The method of claim 9 wherein the reducing agent is added to both the precipitating solution and wash water solution.

12. The method of claim 9 wherein both the reducing agent and iron-complexing agent are added to both the precipitating solution and wash water solution.

References Cited by the Examiner

UNITED STATES PATENTS

| | | | |
|---|---|---|---|
| 2,719,142 | 9/1955 | Van Dijk et al. | 260—83.7 |
| 2,927,065 | 3/1960 | Gerlicher et al. | 260—83.7 |
| 2,933,467 | 4/1960 | Borunsky | 260—83.7 |
| 3,054,762 | 9/1962 | Rees | 260—17 |

FOREIGN PATENTS

| | | |
|---|---|---|
| 826,709 | 1/1960 | Great Britain. |

OTHER REFERENCES

Bovey et al.: High Polymers, vol IX, "Emulsion Polymerization," Interscience (1955).

JOSEPH L. SCHOFER, *Primary Examiner.*

LEON J. BERCOVITZ, *Examiner.*

C. R. REAP, H. I. CANTOR, *Assistant Examiners*